July 11, 1939.  E. C. CORK ET AL  2,165,961
HIGH FREQUENCY SIGNALING SYSTEM
Filed Oct. 21, 1936
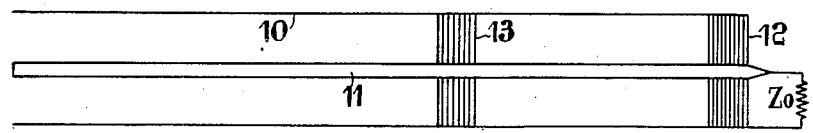
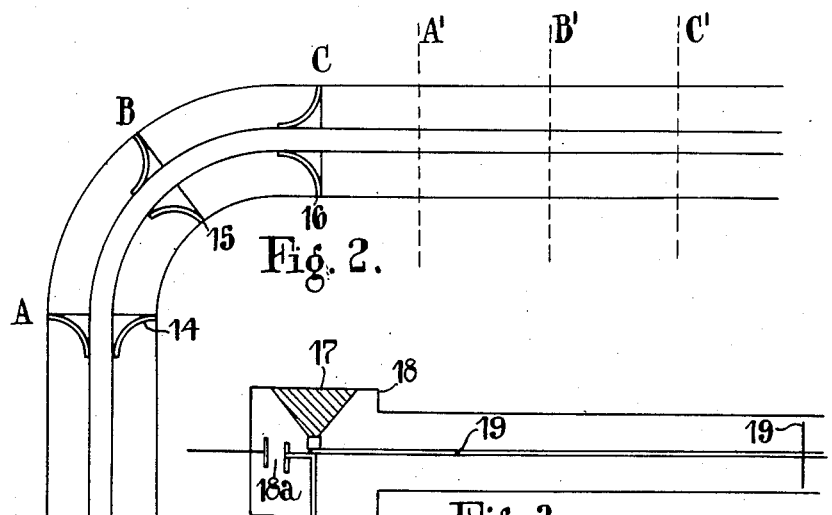
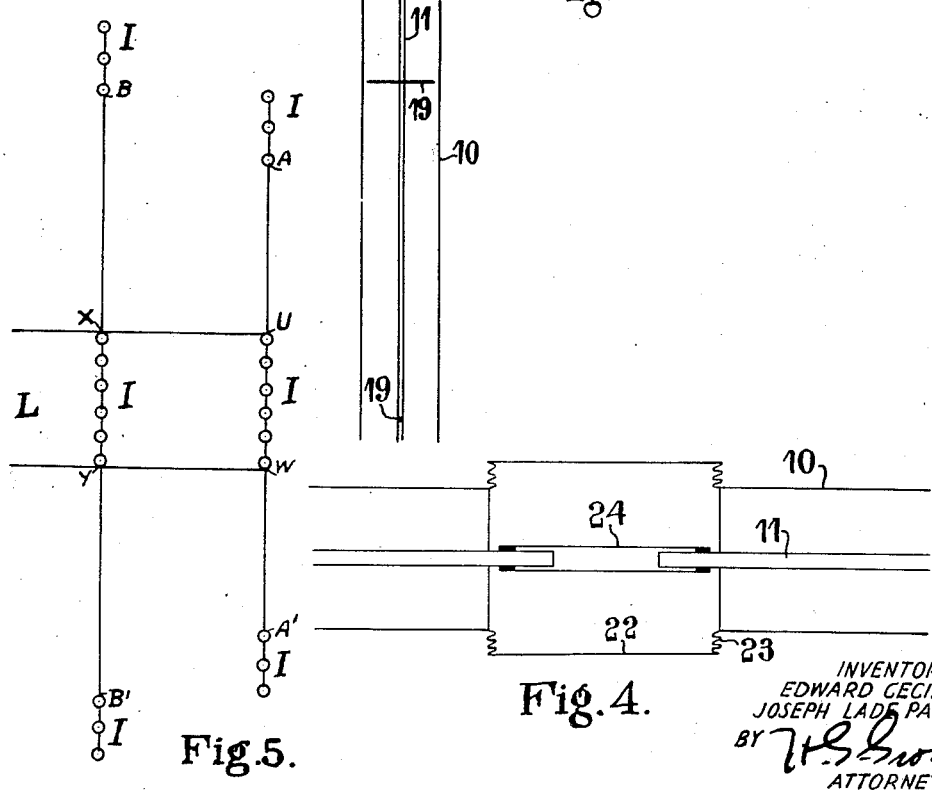
INVENTORS
EDWARD CECIL CORK
JOSEPH LADE PAWSEY
BY
ATTORNEY Patented July 11, 1939

2,165,961

UNITED STATES PATENT OFFICE 2,165,961

HIGH FREQUENCY SIGNALING SYSTEM

Edward Cecil Cork, Ealing, London, and Joseph Lade Pawsey, Hillingdon, England, assignors to Electric & Musical Industries Limited, Hayes, England, a company of Great Britain Application October 21, 1936, Serial No. 106,750
In Great Britain October 22, 1935

26 Claims. (Cl. 178—44)

This invention relates to high frequency signaling systems.

In high frequency signaling systems such as are employed for television and other purposes feeders are commonly used for carrying high frequency currents from one point to another, for example, from a wireless transmitting apparatus to an aerial located at a point remote from the transmitting apparatus. Such a feeder usually comprises a conductor which, in order that the attenuation of the feeder may be low, is air-spaced from the return conductor over the greater part of its length. The conductors may be separated and supported at intervals by insulators. The capacity of the feeder is therefore greater at the points of support than at other points along its length. In general, when such a feeder is terminated by a resistance equal to the characteristic impedance of the unloaded feeder, the impedance of the feeder is found to vary over a considerable range of values as the result of only a small change in the frequency of the applied signal. In one particular example a feeder has a characteristic impedance of 80 ohms and it is terminated by an 80 ohm resistance shunted by a condenser of 5 micro-microfarads capacity being the extra capacity introduced by a large insulator at the end. The feeder is to operate at a frequency of 44 megacycles per second and its length is 440 feet, this length being equal to 20 wavelengths. It can be shown that a change of the applied frequency of 1.25% (0.55 megacycles per second) will change the input parallel impedance of the line from its maximum to its minimum value. In this particular case the maximum input impedance is 89 ohms and the minimum is 71 ohms. This variation may considerably interfere with the operation of the transmitter or the aerial or with any other aparatus with which the feeder may be used.

It is an object of the present invention to overcome the variation with frequency of the input impedance of a feeder caused by supporting insulators.

Certain types of short wave transmitting aerials, are composed of lengths of wire each about equal to one half of the operating wave length and supported by insulators. Similar lengths of wire serve as reflectors for the energy radiated from the aerial sections.

It has been found that the impedance of an aerial of this type may vary with weather or temperature conditions. Thus, when the aerial system is wet the impedance is different from that when the aerial system is dry. This has been found to be due to differences in the effective capacity or of shunt impedance introduced by the insulators used for supporting the aerial elements or the open wire line connected to them under different weather conditions.

A further object of the invention is, therefore, to provide an improved short wave transmitting aerial system in which changes in impedance of the radiating system at a given frequency due to the effect of the change in impedance of the insulators are prevented or substantially reduced.

According to one feature of the invention a high frequency signaling system is provided including a feeder comprising a conductor spaced from another conductor and feeding a load and wherein a variation of the input impedance of said feeder due to localised impedance introduced between said conductors within the operating frequency band is prevented or substantially reduced by introducing in said feeder localised impedance which serves to neutralise the effect of said first-mentioned impedance.

In one form of the invention as applied to a concentric type of feeder composed of an outer sheath and an inner conductor held in spaced relationship with respect to said sheath by insulators disposed at intervals along its length, the variation of the input impedance of said feeder due to the shunt capacity of said insulators or other irregularities is eliminated or substantially reduced within the operating frequency band by arranging the spacing of said insulators or by introducing localised reactance in such a manner that the effect of said shunt capacity or other irregularities is neutralised. The insulators for this purpose are spaced one-quarter of a wavelength apart or an odd multiple of one-quarter wavelengths apart. If, for example, it is necessary to provide additional insulators for properly positioning the central conductor relatively to the outer sheath at a bend in the latter, the effect of the additional insulators may be neutralised by disposing a similar set of insulators one-quarter of a wave-length away.

According to another feature of the invention, insulating members mechanically supporting or connecting and electrically separating high frequency conductors are so spaced apart from each other that changes in impedance of the radiating system at a given frequency due to the effect of the change in impedance of the insulators are prevented or substantially overcome.

The invention may be further applied for the purpose of preventing or substantially reducing a change of impedance as will be hereinafter more fully explained.

In order that the said invention may be clearly understood and readily carried into effect, the same will now be more fully described with reference to the accompanying drawing, in which—

Figure 1 is a diagrammatic view illustrating a portion of a concentric feeder for a high frequency signaling system;

Figure 2 illustrates the application of the invention to a portion of a feeder in which localised reactance at a bend is substantially reduced;

Figure 3 illustrates a further example of a bent feeder in which the effect of additional insulators at the bend is overcome or substantially reduced;

Figure 4 illustrates the application of the invention to an expansion joint which is sometimes employed in a feeder system; and Figure 5 illustrates the application of the invention to an aerial system.

Referring now more particularly to Figure 1 of the accompanying drawing, a portion of the concentric feeder is shown, comprising an outer tubular sheath 10 and an inner conductor 11, such a feeder being employed, for example, to connect a high frequency transmitter to an aerial. In this figure, the central conductor 11 is held concentrically with respect to the outer sheath 10 by an insulator 12 and is terminated by a resistance $Z_0$ equal to the characteristic impedance of the unloaded feeder. This resistance may be that of the aerial which then must be therefore of impedance $Z_0$. The effect of the insulator 12 is to introduce a shunt capacity at the insulator with the result that the impedance of the feeder is found to vary over a considerable range of values as the result of only a small change in the frequency of the applied signal. This shunt capacity can be neutralised or compensated by inserting an effective negative capacity at the insulator or an integral number of half wavelengths away. The positioning of the negative capacity a half wavelength away is permissible since it can be shown that a half wavelength of line acts as a 1:1 transformer. The effective negative capacity may be obtained by reducing the ratio of the radii of the conductors in the region of the insulator, which causes not only a reduction of the normal capacity of the line but also a slight increase in the inductance of the line.

More particularly the effective negative capacity may be obtained by inserting a similar insulator 13 of like construction a quarter of a wavelength away or an odd multiple of quarter wavelengths. It can be shown that the positioning of the insulator a quarter of a wavelength away results, due to the transforming action of the quarter wavelength line, in the introduction of the required negative capacity, that is to say, the required value of inductance to neutralise the shunt capacity of the insulator 12.

Thus, with the effect of the insulator 12 neutralised by the insulator 13, the input impedance at any point further down the line is substantially equal to the characteristic impedance of the feeder. Thus the input impedance is substantially independent of frequency, provided the spacing of the insulators 12 and 13 is one quarter of the operating wavelength.

The invention may be applied where, for example, it is necessary to provide additional insulators at a bend in the feeder, and such an example of the invention is shown in Figure 2 of the drawing from which it will be seen that three insulators 14, 15 and 16, are provided at the bend at the points A, B and C, and the effect of these insulators is neutralised by providing three similar insulators at the points $A_1$, $B_1$ and $C_1$, indicated in dotted lines, the spacing of the insulators A—$A^1$, B—$B^1$, and C—$C^1$ being a quarter of the operating wavelength. Any such additional insulators may be disposed either in front or to the rear of an insulator 14, 15 or 16 which the additional insulator is compensating.

Similar results may be obtained by placing the insulators or groups of insulators at a separation of any odd number of quarter wave-lengths greater than 1 but such an arrangement suffers from the disadvantage that the electrical length of the section separating the insulators deviates more rapidly from an odd multiple of one-quarter wavelength with a change of frequency. This leads to imperfect cancellation at neighbouring frequencies with the result that the input impedance shows a variation given by the sum of two sine waves of slightly different frequency which is known to give rise to beat phenomena.

It will also be appreciated that in a feeder system an even number of insulators separated by a quarter of the operating wave length may be disposed along the whole length of the feeder without introducing a modification of the input impedance over a wide range of frequencies.

Figure 3 of the drawing illustrates another application of the invention at the bend of a feeder and in this case the central conductor 11 is supported at the bend by an insulator 17 which is necessarily of considerable strength for mechanical reasons and hence normally introduces a large localised capacity. The increased capacity at the bend can be overcome by providing an angle-box 18 joining the two portions of the sheath 10, the interior dimensions of the angle-box being such as to cancel the excess capacity or to produce a slight deficiency of capacity, in which latter event the deficiency is counteracted by the provision of an adjustable condenser $18^a$. The central conductor 11 may be centralized with respect to the sheath 10 by the provision of rod-like insulators 19, which can be disposed in various angular positions with respect to one another whereby the central conductor is centralised.

Another way in which localised excess or deficiency of capacity may be corrected is, as aforesaid, by localised variation of the inductance of the feeder. Thus the inductance of the central conductor may be increased at each insulator in order to keep the characteristic impedance constant. The increase of inductance may be obtained by localised reduction of the diameter of the central conductor. Similarly, if a local decrease of inductance is required, the diameter of the central conductor may be locally increased.

The invention can also be applied to neutralise the effect produced by an expansion joint which it is sometimes necessary to provide in the feeder, a typical form of expansion joint being shown in Figure 4. In this case two lengths of the sheath 10 are connected to a portion 22 of enlarged diameter by flexible connections 23 and two lengths of the inner conductor 11 are connected together by a sleeve 24. The irregularity introduced in the feeder by the provision of the expansion joint can be neutralised by making the expansion joint of a length equal to a quarter of the operating wavelength, provided that the ratio of the radii of the conductors of the expansion joint is the same as that of the conductors of the feeder, the irregularities of this ratio which necessarily occur at the junctions of the expansion joint and the feeder being then mutually compensating. Alternatively, a similar expansion joint may be inserted in the line a quart of a wavelength away.

In a further form the expansion joint may be equal in length to a half of the operating wave length. It is not then necessary for the characteristic impedance of this section to be equal to that of the feeder.

The invention has been described above with reference to one particular form of feeder. The invention may also be applied to other types of feeder which have localised reactance at points spaced apart along the length thereof. For example, the cable may be one in which a conductor is located within an insulating tube and is held air-spaced therefrom over the greater part of its length by virtue of its shape or configuration. For example, the conductor may have suitable kinks or crinkles formed therein at intervals along its length. The capacity of a cable of this type is greatest at the points of contact of the kinks with the insulating tube, and the present invention may be applied in order to eliminate or reduce the undesired effects of this localised capacity.

The invention can also be applied to a high frequency transmitting aerial and in this connection reference will now be made to Figure 5.

As stated above, it has been found that the impedance of an aerial of the kind shown in Figure 5 may vary with weather or temperature conditions. Thus, when the aerial system is wet the impedance is different from that of the aerial system when dry. This has been found to be due to differences in the effective capacity of the insulators used for supporting the aerial elements or the open wire line connected to them under different weather conditions.

In Figure 5 an open wire line L feeds an aerial unit A, A¹ behind which is a reflector B, B₁. Insulators I link the upper and lower portions of the sections A, A₁ and B, B₁. The impedance between the points X and Y in this case may be of the order of 400 ohms and, in consequence, it follows that a change of capacity of one micro-micro-farad, which is 3600 ohms at 45 megacycles, is an appreciable variation, about 10%. Such a variation impedance in the case of a television aerial fed through a long feeder line results in bright edges appearing in the received picture.

By making the section of line UXWY a quarter of a wave length long, equal changes of capacity and leakage of the two sets of insulators are self cancelling.

Further, insulators are usually required to support the open line L and the invention is accordingly applied by spacing such insulators one quarter of a wave length apart. A dummy set of insulators may be used to neutralise the effect of a set of insulators, it being assumed that the dummy set will be exposed equally to the weather and therefore subject to the same changes. In the case of the insulators at A, A₁ and B, B₁, as the lines A, U, A₁, W, B, X, and B₁ Y are each approximately equal to half the operating wave length A and A₁ are effectively in series across U, W and B and B₁ effectively in series across X, Y and will approximately cancel as previously explained in connection with the section of the line UXWY.

It will be seen from the foregoing that the invention is generally applicable to aerial and feeder systems in which the insulators are subject to weather or temperature effects. This application of the invention consists in the placing of insulators subject to similar changes in such positions that those changes will have no effect upon the impedance of the radiating or feeding system. In the particular case of matched transmission lines or of aerials with no reflected wave, sets of insulators will in accordance with the invention be arranged in pairs at quarter wave length spacings.

In the case of an unmatched transmission line or of an aerial on which there are standing waves, the compensating set of insulators is also spaced one quarter of a wave length but is modified depending on the extent to which the line is unmatched. For example, two sets of compensating insulators at the same point may be used to compensate the other set a quarter of a wavelength away.

It will thus be seen that the arrangement described enables the aerial impedance as measured from a certain point to be maintained constant.

We claim:

1. A high frequency signaling system, including a feeder comprising a conductor spaced from another conductor and feeding a load, the variation of the input impedance of said feeder within the operating frequency band due to localised impedance introduced between said conductors being prevented or substantially prevented by introducing in said feeder localised impedance so located with respect to said first-mentioned impedance as to neutralize the effect produced thereby.

2. A high frequency signaling system as in claim 1, wherein the variation of the input impedance of said conductors due to said localised impedance is prevented by disposing along the length of said conductors a similar impedance spaced from said localised impedance substantially an odd number including unity of a quarter of the operating wavelength.

3. A high frequency signaling system as in claim 1, in which the variation in input impedance is due to localised reactance and is neutralised by an effective opposite reactance produced by altering the ratio of the radii of the conductors at a distance approximately equal to any integral number, including zero, of half wavelengths away from the point of localized reactance.

4. A high frequency signaling system as in claim 1, wherein said conductors are held in spaced relationship by a plurality of insulators and wherein the shunt capacity introduced by each insulator is neutralised by a similar insulator separated by an odd number including unity of a quarter of the operating wavelength.

5. A high frequency feeder system supplying energy to a matched load comprising a concentric feeder composed of an outer sheath and an inner conductor held in spaced relationship with respect to said sheath by insulators disposed at intervals along its length, the variation of the input impedance of said feeder due to the shunt capacity of said insulators or other irregularities being eliminated or substantially reduced within the operating frequency band by an effective negative capacity introduced at points located at any integral number, including zero, of half wave lengths away from each of said shunt capacities so that the effect of such shunt capacity is neutralized.

6. A high frequency electric feeder system supplying energy to a matched load comprising a concentric feeder composed of an outer sheath and an inner conductor held in spaced relationship with respect to said sheath by insulators disposed at intervals along its length, the variation of the input impedance of said feeder due to the shunt capacity of said insulators being eliminated or substantially reduced within the operating frequency band by arranging the spacing of said insulators such that each insulator is spaced from another insulator by an odd multiple, including unity, of a quarter of the length of the operating wavelength whereby the effect of such shunt capacity is neutralized.

7. A high frequency electric feeder system supplying energy to a matched load comprising a concentric feeder composed of an outer sheath and an inner conductor held in spaced relationship with respect to said sheath by an even number of insulators disposed at intervals along its length, each insulator being spaced from an adjacent insulator by a quarter of the length of the operating wavelength whereby the variation of the input impedance of said feeder due to the shunt capacity of said insulators is eliminated or substantially reduced within the operating frequency band.

8. A high frequency electric feeder system supplying energy to a matched load comprising a concentric feeder composed of an outer sheath and an inner conductor held in spaced relationship with respect to said sheath, said feeder having one or more bends along its length, and insulators disposed at intervals along each of said bends for maintaining the spaced relationship between said sheath and conductor, the variation of the input impedance of said feeder due to the shunt capacity of said insulators being neutralized by a similar set of insulators disposed at intervals along the length of said feeder a quarter of the length of the operating wavelength away from the insulators at said bend.

9. A high frequency electric feeder system comprising a conductor disposed within and spaced from a sheath, wherein the effect of shunt capacity at a portion of the feeder, for example, at a bend in the feeder, is neutralized by increasing the size of the sheath sufficiently to compensate for said capacity.

10. A high frequency electric feeder system comprising a conductor disposed within and spaced from a sheath, wherein an expansion joint is provided in the said system and wherein the effect of said expansion joint on the characteristic impedance of said system is neutralized by making the expansion joint of a length equal to a quarter of the operating wavelength with the ratio of the radii of the conductors of the expansion joint equal to the ratio of the radii of the conductors of the feeder.

11. A high frequency signaling system wherein insulating members are provided for separating high frequency conductors, said insulating members being so spaced apart from each other that changes in impedance of a radiating system at a given frequency due to the effect of the change in impedance of the insulators are prevented or substantially reduced.

12. A high frequency signaling system as in claim 11 comprising an aerial unit associated with a reflecting unit and fed by an open wire line, the portion of the line connected to the aerial unit and reflecting unit being an approximately matched line a quarter of a wavelength long.

13. A high frequency signaling system as in claim 11, wherein insulators are provided supporting the open line, said insulators being spaced one quarter of a wavelength apart.

14. A high frequency signaling system as in claim 11, wherein the effect of the said insulators is neutralized by inserting a dummy set of insulators a quarter of a wavelength apart.

15. A high frequency electric feeder system supplying energy to a matched load comprising a concentric feeder composed of an outer sheath and an inner conductor held in spaced relationship with respect to said sheath by insulators disposed at intervals along its length, the variation of the input impedance of said feeder due to the shunt capacity of said insulators or other irregularities being eliminated or substantially reduced within the operating frequency band by introducing localized reactance so arranged with respect to said shunt capacities that the effect of such shunt capacity is neutralized.

16. A high frequency electric feeder system comprising a conductor disposed within and spaced from a sheath, wherein the effect of shunt capacity at a portion of the feeder, for example, at a bend in the feeder, is neutralized by increasing to a predetermined degree the size of the sheath, and an adjustable condenser located at said increased portion and connected between said conductor and said increased portion of sheath.

17. A high frequency electric feeder system comprising a conductor disposed within and spaced from a sheath, wherein an expansion joint is provided in the said system and wherein the effect of said expansion joint on the characteristic impedance of said system is neutralized by making the expansion joint of a length equal to half of the operating wavelength.

18. A high frequency electric feeder system comprising a conductor disposed within and spaced from a sheath, wherein an expansion joint is provided in the said system and wherein the effect of said expansion joint on the characteristic impedance of said system is neutralized by making the expansion joint of a length equal to a quarter of the operating wavelength with the ratio of the radii of the conductors of the expansion joint equal to the ratio of the radii of the conductors of the feeder, there being an equivalent expansion joint located a quarter of the operating wavelength from said first joint.

19. The method of preventing the formation of appreciable standing waves on a high frequency transmission line having its surge impedance matched at one end, which comprises insulating said line at points along the line spaced apart approximately an odd multiple including unity of a quarter of the length of the communication wave.

20. The method of preventing the formation of appreciable standing waves on a high frequency transmission line having concentric inner and outer conductors, which comprises insulating said inner conductor from said outer conductor at points along the line spaced apart a distance approximately an odd multiple including unity of a quarter wavelength.

21. In combination, a transmission line comprising two conducting paths, a load for said line, means for matching the load to the surge impedance of said line, and a plurality of insulators of like construction spaced along said line and providing a capacitive effect between said paths, said insulators being separated from one another by an odd multiple including unity of a quarter wavelength, the insulators spaced apart by said odd multiple cooperating to prevent the formation of appreciable standing waves.

22. A high frequency concentric transmission line comprising an inner and an outer conductor, and a plurality of insulators of like construction for maintaining said conductors in spaced relation to each other, said insulators being spaced apart from one another along the length of said line by a distance approximately equal to one-quarter the length of the communication wave, the insulators spaced apart by said odd multiple cooperating to prevent the formation of appreciable standing waves.

23. A high frequency concentric transmission line adapted to transmit a band of frequencies comprising an inner and an outer conductor, and a plurality of insulators of like construction for maintaining said conductors in spaced relation to each other, said insulators being spaced apart from one another along the length of said line by a distance approximately equal to one-quarter the length of the wave corresponding to the mean frequency of said band, the insulators spaced apart by said odd multiple cooperating to prevent the formation of appreciable standing waves.

24. In combination, a high frequency transmission line comprising two conducting paths, a plurality of insulators of like construction spaced apart approximately one-quarter of the operating wave along one section of the line, and other insulators spaced apart approximately a higher odd multiple of a quarter wave along another section of the line, said insulators providing capacity effects between said paths and functioning to support said line, the insulators spaced apart by said odd multiple cooperating to prevent the formation of appreciable standing waves.

25. In combination, a high frequency line comprising two conducting paths, the surge impedance of said line being at least substantially matched at one end of the line, and a pair of insulators of like construction spaced apart along the length of said line an odd multiple including unity of a quarter wavelength from each other and cooperating with each other to prevent the formation of appreciable standing waves.

26. In combination, a high frequency line comprising two conducting paths, the surge impedance of said line being at least substantially matched at one end of the line, a pair of insulators of like construction spaced apart along the length of said line an odd multiple including unity of a quarter wavelength from each other and cooperating with each other to prevent the formation of appreciable standing waves.

EDWARD CECIL CORK.
JOSEPH LADE PAWSEY.